(12) United States Patent
Canagasaby et al.

(10) Patent No.: US 7,711,939 B2
(45) Date of Patent: May 4, 2010

(54) SERIAL LINK APPARATUS, METHOD, AND SYSTEM

(75) Inventors: Karthisha S. Canagasaby, Santa Clara, CA (US); Ken Drottar, Portland, OR (US); David S. Dunning, Portland, OR (US); Sanjay Dabral, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 1051 days.

(21) Appl. No.: 11/171,114

(22) Filed: Jun. 30, 2005

(65) Prior Publication Data

US 2007/0025492 A1    Feb. 1, 2007

(51) Int. Cl.
*H03K 3/00*    (2006.01)

(52) U.S. Cl. .................. 713/1; 713/2; 326/83; 326/86; 327/108; 327/109

(58) Field of Classification Search ............. 713/1, 713/2; 326/83, 86; 327/108, 109
See application file for complete search history.

(56) References Cited

U.S. PATENT DOCUMENTS

| | | | |
|---|---|---|---|
| 5,444,410 A | 8/1995 | Polhemus | |
| 5,917,340 A * | 6/1999 | Manohar et al. | 326/82 |
| 5,994,955 A | 11/1999 | Birkeland | |
| 6,704,365 B2 * | 3/2004 | Haycock | 375/257 |
| 6,747,504 B2 * | 6/2004 | Simpson et al. | 327/400 |
| 6,826,390 B1 * | 11/2004 | Tamura | 455/226.1 |
| 7,342,420 B2 * | 3/2008 | Isik et al. | 326/86 |

FOREIGN PATENT DOCUMENTS

WO    WO-2007005794 A2    1/2007

OTHER PUBLICATIONS

"International Search Report for application No. PCT/US2006/025917", (Apr. 26, 2007), (11 Pgs.).

* cited by examiner

*Primary Examiner*—Abdelmoniem Elamin
(74) *Attorney, Agent, or Firm*—Dana B. Lemoine; Lemoine Patent Services, PLLC (57) ABSTRACT

A source terminated serial link can recover from a low power mode by turning on multiple current-mode drivers in a phased sequence where the phased sequence is related to a resonant characteristic of a power supply net.

9 Claims, 6 Drawing Sheets

SERIAL LINK APPARATUS, METHOD, AND SYSTEM

FIELD

The present invention relates generally to input/output (I/O) circuits, and more specifically to serial link I/O circuits.

BACKGROUND

Links-based systems use point-to-point links to communicate between devices. Each of the point-to-point links can be considered as a single serial link. When devices enter low power modes, serial links can also enter low power modes. When recovering from low power modes, power supply transients may occur, and systems may wait for the transients to end before commencing operation.

DESCRIPTION OF EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
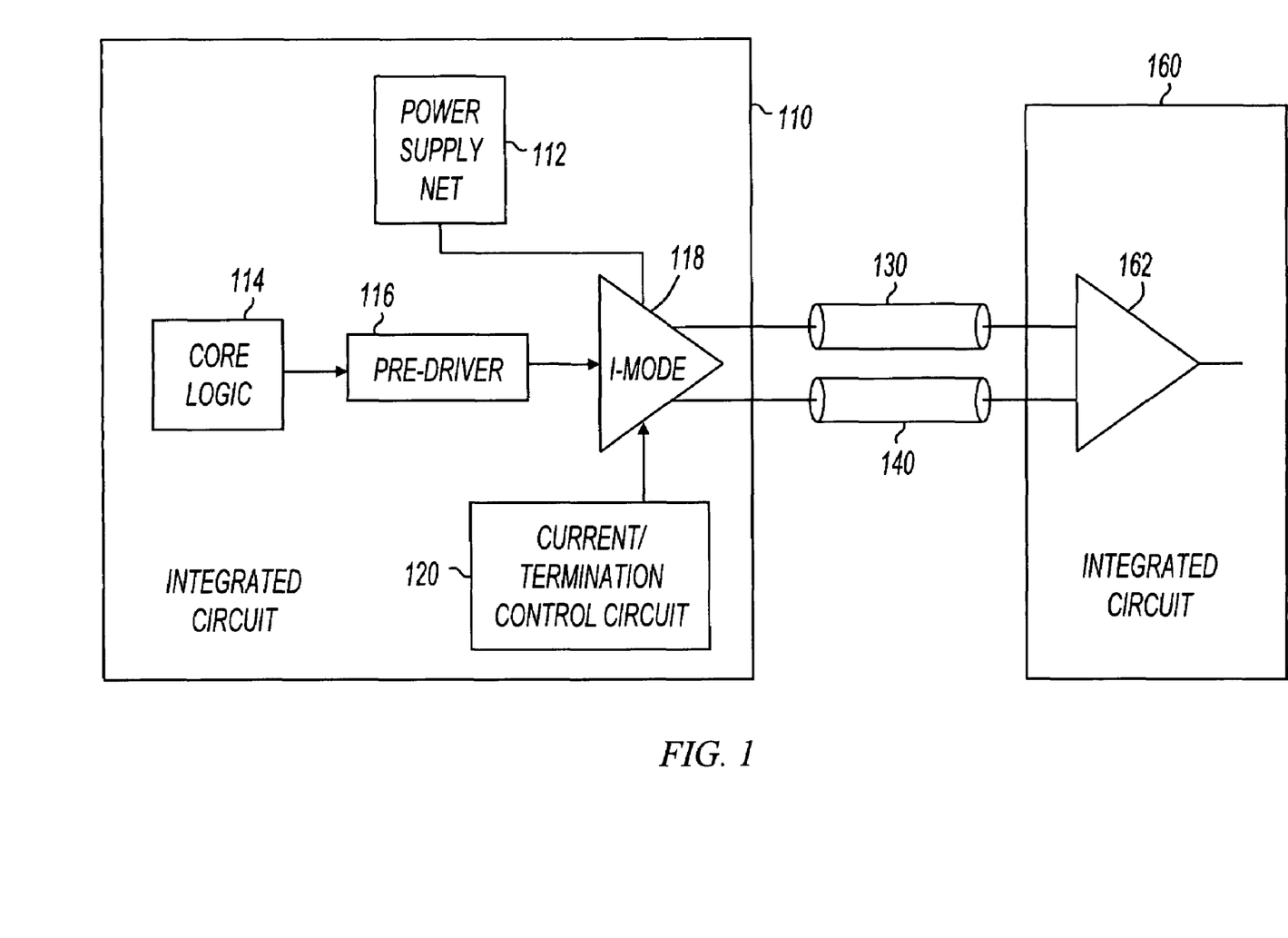
FIG. 1 shows two integrated circuits coupled by a serial link.

FIG. 1 shows two integrated circuits coupled by a serial link. Integrated circuit 110 includes current-mode (I-Mode) driver 118, pre-driver 116, core logic 114, power supply net 112, and current/termination control circuit 120. Integrated circuit 160 is shown including receiver 162. In some embodiments, integrated circuit 160 does not include terminations at the input of receiver 162. In these embodiments, the communications link shown in FIG. 1 is said to be "source terminated."

Current-mode driver 118 within integrated circuit 110 drives conductors 130 and 140 with a differential signal that is received by receiver 162 within integrated circuit 160. Current-mode driver 118 and current/termination control circuit 120 form a serial link circuit within integrated circuit 110. The serial link circuit drives differential data in a serial fashion onto conductors 130 and 140 external to integrated circuit 110.

Core logic 114 represents a core within integrated circuit 110. For example, core logic 114 may implement a processor, a memory controller, or any other logic within an integrated circuit. Pre-driver 116 receives signals from core logic 114 and drives current-mode driver 118.

In operation, the serial link formed by current-mode driver 118 drives current-mode signals on conductors 130 and 140. Power is supplied to current-mode driver 118 through power supply net 112. Power supply net 112 represents any signal interconnect between a power supply and current-mode driver 118. In some embodiments, power supply net 112 is coupled to many serial links at the boundary of integrated circuit 110. Further, in some embodiments, power supply net 112 is coupled to provide power to most, if not all, of integrated circuit 110.

In some embodiments of the present invention, the serial link may enter a low power mode in which current-mode driver 118 substantially reduces its power consumption and maintains voltage levels on the serial link. For example, during a normal operational mode, current-mode driver 118 may drive differential signals on conductors 130 and 140 in response to data signals received from pre-driver 116. Current/termination control circuit 120 may send signals to current-mode driver 118 to cause current-mode driver 118 to reduce its power consumption, and "park" the output voltage levels including the common mode voltage of current-mode driver 118. The common mode voltage is defined as $(V+V\#)/2$ wherein V and V# are voltages driven on conductors 130 and 140. In some embodiments, the link is "parked" at the desired voltage levels by matching simultaneous transmit current reductions with source side termination increases. If the product of the transmit current and termination resistance remains substantially constant, the parked voltage value will substantially match the voltage values of the serial link when operational.

Power supply net 112 may have a resonant characteristic. For example, the physical and electrical characteristics of any signal interconnect within power supply net 112 may cause power supply net 112 to have a time constant and a resonant frequency that contribute to a transient voltage response when the current is abruptly changed. Power supply net 112 may be modeled by resistors, capacitors, and inductors as lumped elements to describe the resonant characteristic of any interconnect involved in power supply net 112. For example, during the design of integrated circuit 110, power supply net 112 may be modeled to estimate the resonant characteristic. Further, the resonant characteristic may be determined experimentally after integrated circuit 110 has been fabricated.

In some embodiments, current/termination control circuit 120 causes current-mode driver 118 to enter a low power mode in a phased sequence so as to reduce any transient effects caused by the resonant characteristics of power supply net 112. For example, in some embodiments, current-mode driver 118 includes many smaller current-mode drivers in parallel, and current/termination control circuit 120 reduces the current consumption of each of the parallel current-mode drivers in a phased sequence that is timed to cause destructive summation of the various transient components on power supply net 112.

Further, in some embodiments, many parallel current-mode drivers within a serial link are turned on in a phased sequence to allow the power supply net voltage level to settle quickly. When the power supply net voltage settles quickly, the "wake up" latency from a reduced power mode be reduced, leading to faster operation. Examples are described with reference to later figures.

FIG. 1 shows a single serial link between integrated circuits but this is not a limitation of the present invention. For example, integrated circuit 110 may include many current-mode drivers to form many serial links. Also for example, integrated circuit 160 may include current-mode drivers to transmit data to integrated circuit 110 using serial links.

Figure 2:
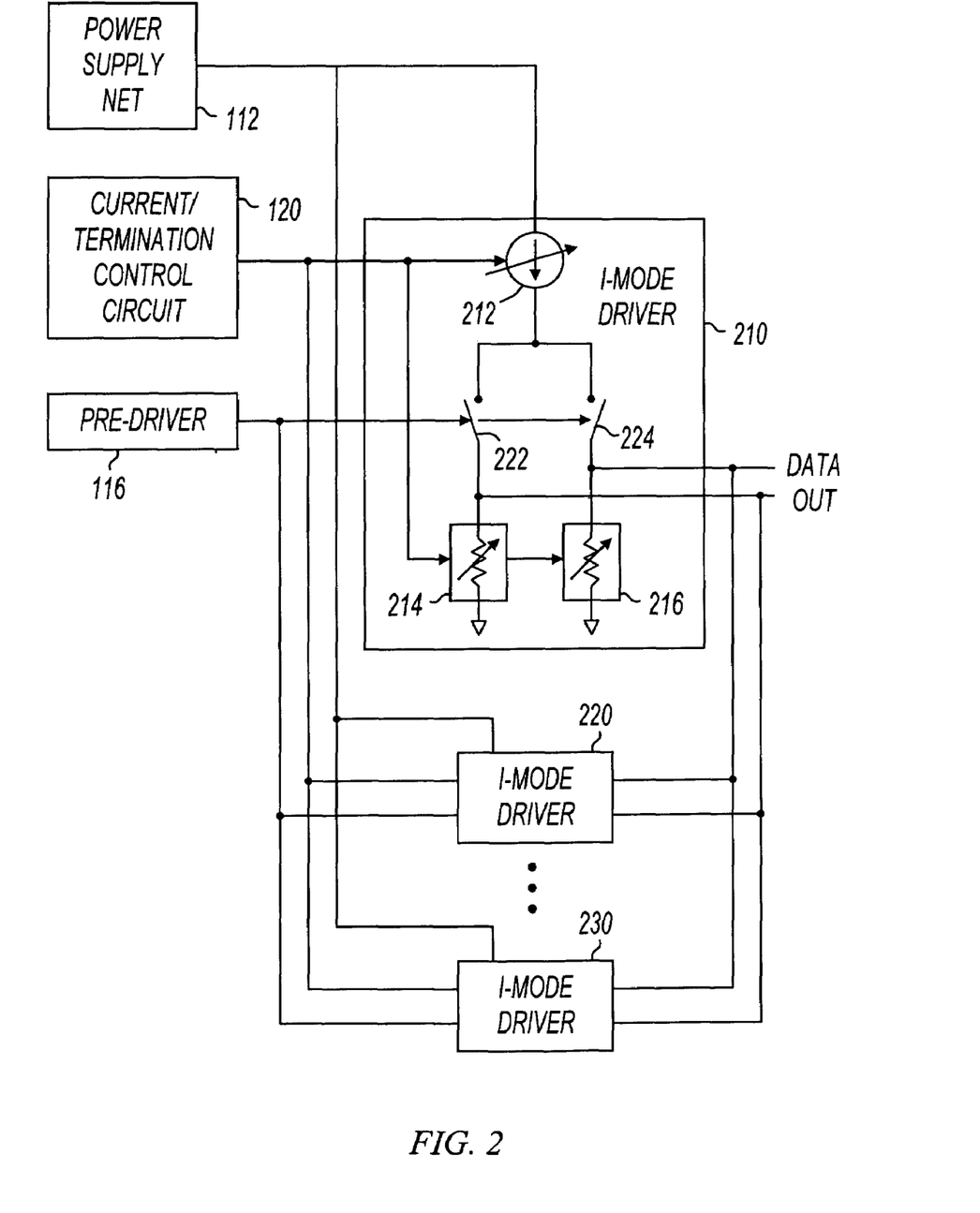
FIG. 2 shows parallel current-mode drivers.

FIG. 2 shows parallel current-mode drivers. As shown in FIG. 2, current-mode drivers 210, 220, and 230 are coupled in parallel. Each of current-mode drivers 210, 220, and 230 receive power from power supply net 112, receive a signal from pre-driver 116, and receive control signals from current/termination control circuit 120. Power supply net 112, current/termination control circuit 120, and pre-driver 116 are described above with reference to FIG. 1. The parallel combination of current-mode drivers shown in FIG. 2 represent a single current-mode driver in a serial link, such as current-mode driver 118 (FIG. 1).

Current-mode driver 210 includes variable current source 212, switches 222 and 224, and variable resistance termination resistors 214 and 216. In some embodiments, variable current source 212 can be turned on and off. For example, variable current source 212 may be implemented using a current mirror having switching transistors capable of turning off the current flow. Further, variable resistance termination resistors 214 and 216 may be able to switch between two or more resistance values. For example, each of resistors 214 and 216 may include parallel combinations of resistors in series with switching transistors, where the switching transistors can either electrically include a resistor in the termination circuit or electrically exclude a resistor from the termination circuit.

Current/termination control circuit 120 is shown with a single line to variable current source 212 and termination resistors 214 and 216. In some embodiments, current/termination control circuit 120 sources many separate digital signals to control the operation of variable current source 212 and resistors 214 and 216. Pre-driver 116 is shown sourcing a data signal to operate switches 222 and 224. In some embodiments, pre-driver 116 sources two complementary digital signals to operate switches 222 and 224. Switches 222 and 224 may be implemented using any type of switching device, including metal oxide semiconductor field effect transistors (MOSFETs) or junction field effect transistors (JFETs).

Current-mode drivers 220 and 230 include the same circuitry as that shown in current-mode driver 210. Each of current-mode drivers 210, 220, and 230 receive power from the same power supply net 112, and may receive the same data from pre-driver 116. For example, if transmit pre-emphasis is utilized, each pre-driver and driver may receive a data signal or a delayed and/or inverted version of the data signal. Each of current-mode drivers 210, 220, and 230 may receive different control information from current/termination control circuit 120. For example, in some embodiments, current/termination control circuit 120 may turn off each of the current sources within current-mode drivers 210, 220, and 230 in a phased sequence to reduce any transients on power supply net 112. For example, when entering a low power mode, current/termination control circuit 120 may turn off current source 212, and then a short time later turn off a current source within current-mode driver 220, and then again a short time later turn off a current source within current-mode driver 230. When entering a low power mode, one or more of the current-mode drivers may be left on to hold a voltage on the serial link. Also when entering a low power mode, current/termination control circuit 120 may modify resistance values of the variable termination resistors in a phased sequence. For example, current/termination control circuit 120 may increase the resistance of variable resistors 214 and 216 when current-mode driver 212 is turned off. Further, current/termination control circuit 120 may increase resistance values of termination resistors in the remaining current-mode drivers when their respective current sources are turned off when entering a low power mode.

Current-mode drivers may also be enabled in a phased sequence for the serial link to recover from a low power mode. For example, while in a low power mode, only current-mode driver 230 may be turned on with the remaining current-mode drivers turned off. When recovering from the low power (or "sleep") mode, current/termination control circuit 120 may enable variable current source 212 and reduce the resistance values of variable resistors 214 and 216. A short time later, current/termination control circuit 120 may turn on a variable current source within current-mode driver 220 and also reduce resistance values of variable termination resistors within current-mode driver 220.

FIG. 2 shows three parallel current-mode drivers to form one larger current-mode driver in a serial link circuit. In some embodiments, many more than three current-mode drivers are coupled in parallel. For example, in some embodiments, 20 current-mode drivers are coupled in parallel, and in other embodiments 32 current-mode drivers are coupled in parallel. The number of parallel drivers for a single serial link is not a limitation of the present invention.

Figure 3:
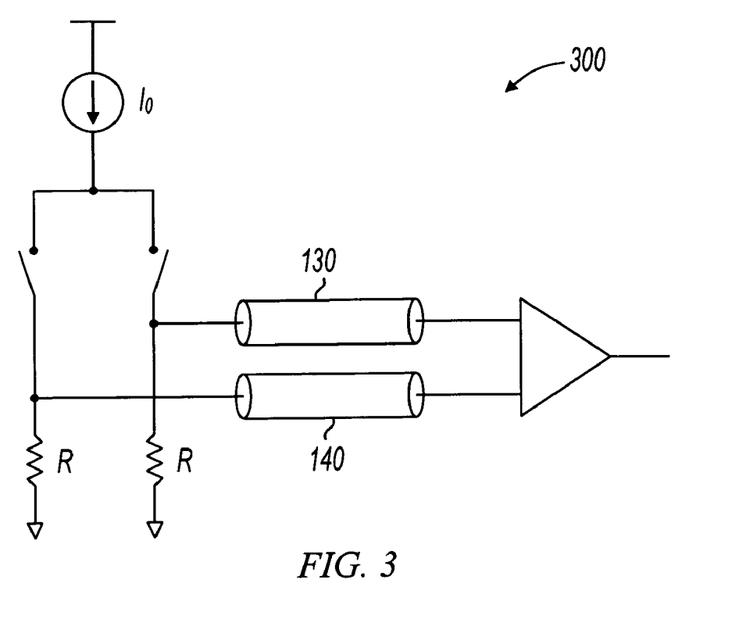
FIG. 3 shows a serial link in an operational mode.

FIG. 3 shows a serial link in an operational mode. Serial link 300 represents a link such as that shown in FIG. 1 or 2, with the current-mode driver driving a full current value, and termination resistors at normal operational termination resistance values. For example, referring now back to FIG. 2, if all of the parallel current-mode drivers 210, 220, and 230 are operational with their respective current sources turned on and their variable resistor terminations at their nominal resistance values, the operational serial link 300 results. The current value $I_0$ represents the sum of all currents in the various parallel current-mode drivers.

Figure 4:
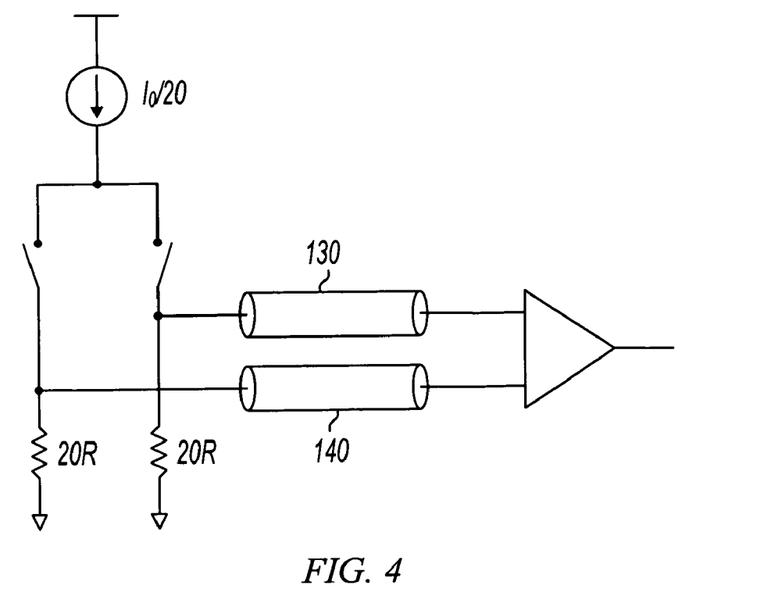
FIG. 4 shows a serial link driver in a low power mode with convenient common mode parking.

FIG. 4 shows a serial link driver in a low power mode. The current value shown sourced by the current source in FIG. 4 is $I_0/20$. In some embodiments, this corresponds to 20 parallel current-mode drivers with 19 of the 20 drivers turned off and one driver left turned on. Further, each of the termination resistors are shown having a value 20 times the termination resistance value of the (nominal) operational mode shown in FIG. 3. As described above with reference to FIG. 1, if the product of drive current and termination resistance is substantially constant between the operational and low power modes, then a desired voltage may be maintained on the serial link when "parked." When the serial link is in the low power mode and parked as shown in FIG. 4, the voltages on conductors 130 and 140 are stable so that when the serial link is brought out of a low power mode, the serial link recovers in an orderly fashion.

Figure 5:
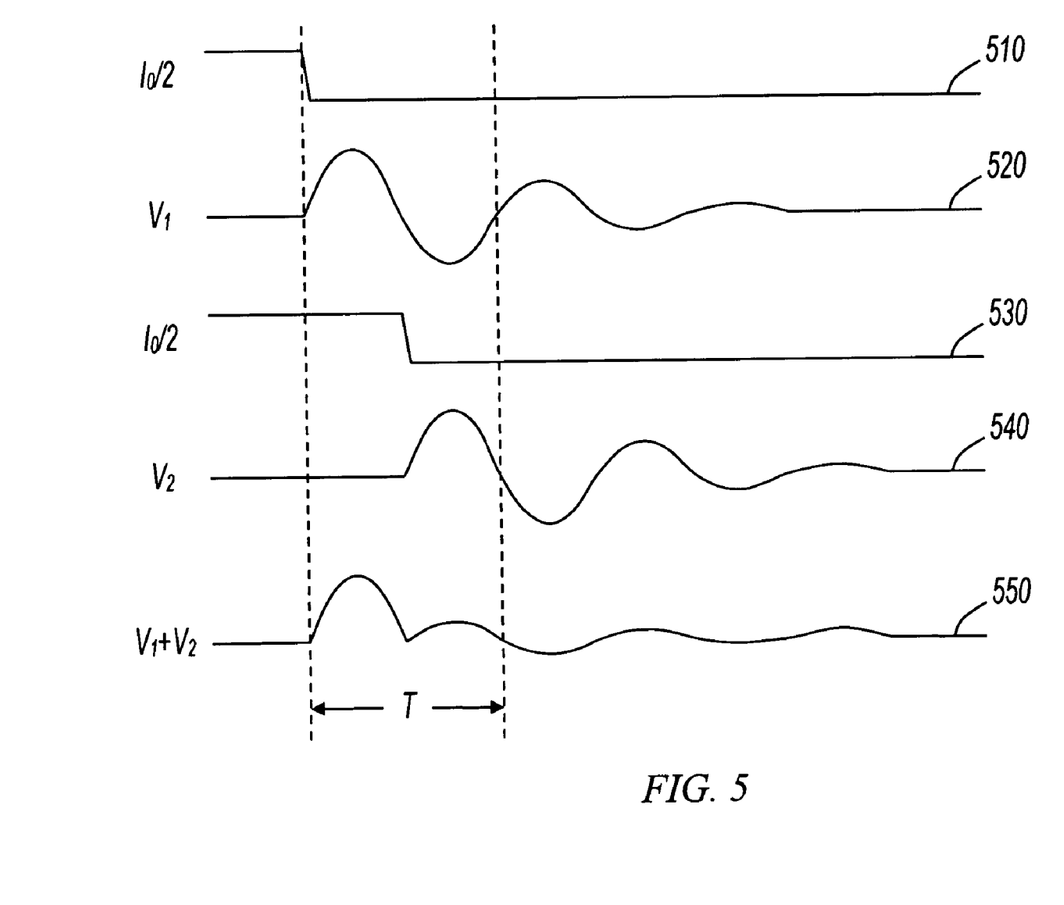
FIG. 5 shows voltage and current waveforms.

FIG. 5 shows voltage and current waveforms. Current waveforms 510 and 530 show two current sources being turned off at different times. Each current source sources a value of $I_0/2$. This corresponds to a current-mode driver in a serial link having two smaller parallel current-mode drivers, each having a current source that sources $I_0/2$. Waveform 520 shows a transient voltage waveform that may be present on a power supply net as a result of the current change shown at 510. For example, referring now back to FIG. 2, if variable current source 212 turns off as shown at 510, a voltage waveform such as 520 may appear on power supply net 112 because of the resonant characteristic of the power supply net. Accordingly, the voltage waveform at 520 has a period of T, where T is related to the resonant characteristic of the power supply net.

The current waveform shown at 530 represents a second current-mode driver being turned off (½) T after the first parallel current-mode driver is turned off. The transient voltage waveform shown at 540 would result if current waveform 530 were the only change in current on the power supply net. However, both current waveforms 510 and 530 are present on the power supply net, and so the voltage on the power supply net is the summation of voltage waveforms of 520 and 540. This summation is shown at 550. As shown by the voltage waveform 550, when parallel current-mode drivers are turned off in a phased sequence where the timing of the sequence is related to the resonant characteristic of the power supply net, the transient voltage on the power supply net may be reduced.

The example of FIG. 5 represents two parallel current-mode drivers being turned off in a phased sequence to put a serial link in a reduced power mode. In some embodiments, many more than two parallel current-mode drivers are turned off to put a serial link in low power mode. For example, in some embodiments, 20 or more parallel current-mode drivers may be turned off one at a time with a separation of (½) T to reduce the transient waveform even further. Also for example, parallel current-mode drivers may be turned on in a phased sequence similar to that shown in FIG. 5 to reduce a voltage transient on the power supply net when the serial link is recovering from a reduced power mode.

Figure 6:
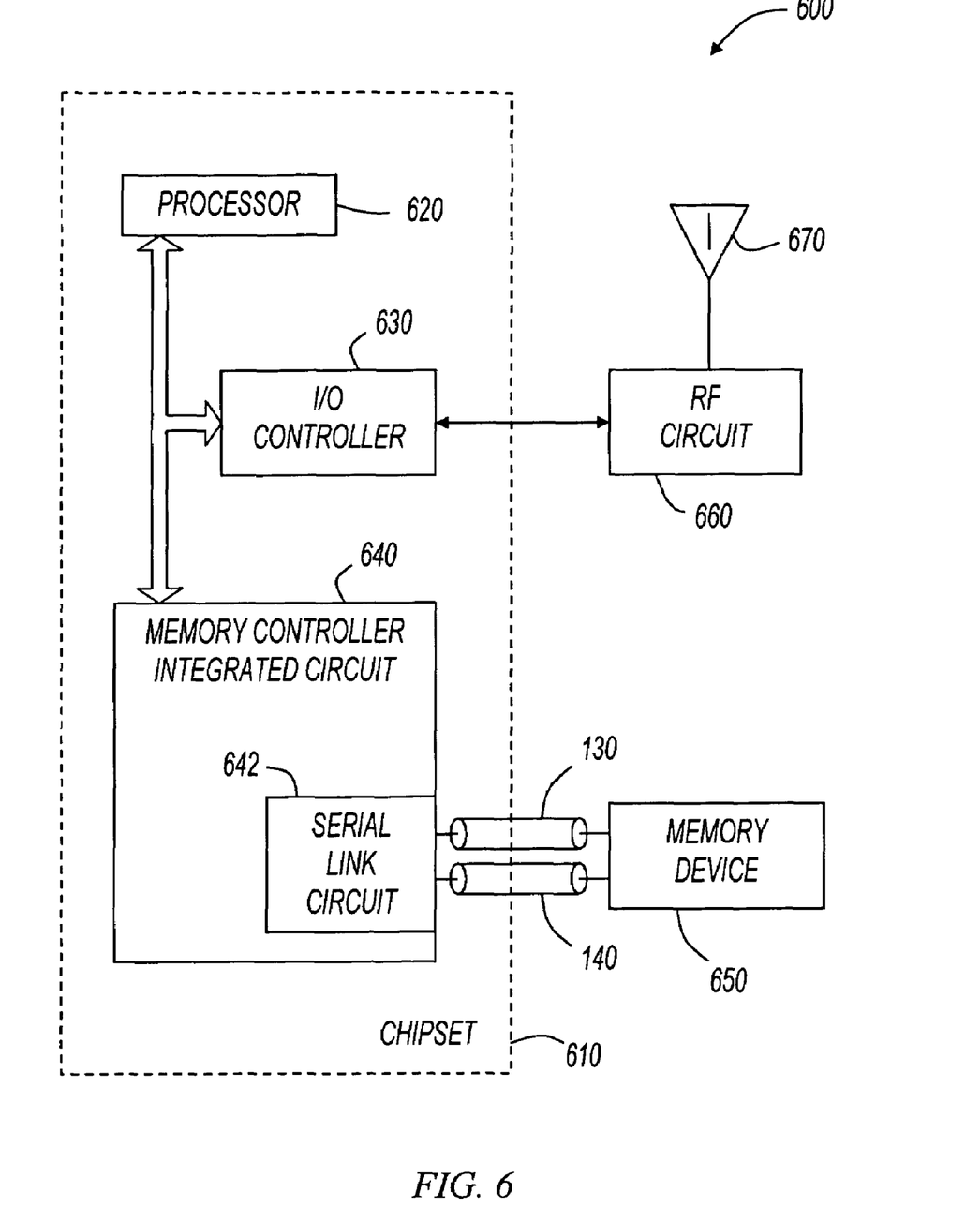
FIG. 6 shows a diagram of an electronic system in accordance with various embodiments of the present invention.

FIG. 6 shows a system diagram in accordance with various embodiments of the present invention. FIG. 6 shows system 600 including chipset 610, radio frequency (RF) circuit 660, antenna 670, memory device 650 and channels 104 and 124. Chipset 610 includes processor 620, input output (I/O) controller 630, and memory controller 640. In operation, system 600 sends and receives signals using antenna 670, and these signals are processed by the various elements shown in FIG. 6. Antenna 670 may be a directional antenna or an omni-directional antenna. As used herein, the term omni-directional antenna refers to any antenna having a substantially uniform pattern in at least one plane. For example, in some embodiments, antenna 670 may be an omni-directional antenna such as a dipole antenna, or a quarter wave antenna. Also for example, in some embodiments, antenna 670 may be a directional antenna such as a parabolic dish antenna, a patch antenna, or a Yagi antenna. In some embodiments, antenna 670 may include multiple physical antennas.

Radio frequency circuit 660 communicates with antenna 670 and I/O controller 630. In some embodiments, RF circuit 660 includes a physical interface (PHY) corresponding to a communications protocol. For example, RF circuit 660 may include modulators, demodulators, mixers, frequency synthesizers, low noise amplifiers, power amplifiers, and the like. In some embodiments, RF circuit 660 may include a heterodyne receiver, and in other embodiments, RF circuit 660 may include a direct conversion receiver. In some embodiments, RF circuit 660 may include multiple receivers. For example, in embodiments with multiple antennas 670, each antenna may be coupled to a corresponding receiver. In operation, RF circuit 660 receives communications signals from antenna 670, and provides analog or digital signals to I/O controller 630. Further, I/O controller 630 may provide signals to RF circuit 660, which operates on the signals and then transmits them to antenna 670.

Memory controller 640 provides an interface between chipset 610 and memory devices such as memory device 650. Memory controller 640 includes serial link circuit 642 to communicate with memory device 650. For example, serial link circuit 642 is shown coupled to memory device 650 by conductors 130 and 140. Conductors 130 and 140, and serial link embodiments relating thereto, are described with reference to previous figures. Serial link circuit 642 may include one or more parallel current-mode drivers. For example, in some embodiments, serial link circuit 642 may include a plurality of parallel current-mode drivers that can be turned on and off in a phased sequence to efficiently "park" the serial link in a low power mode. Serial link circuit 642 may include any of the serial link embodiments described herein.

Chipset 610 may include any number of integrated circuits, or "chips," and may have any level of integration. For example, in some embodiments, chipset 610 includes processor 620 and memory controller 640 in separate packages. Also for example, in some embodiments, chipset 610 may include processor 620 and memory controller 640 on the same integrated circuit die, or on separate integrated circuit die packaged together.

Example systems represented by FIG. 6 include cellular phones, personal digital assistants, wireless local area network interfaces, or any other suitable system. Many other systems uses for serial link circuits exist. For example, chipset 610 may be used in a desktop computer, a network bridge or router, or any other system without an antenna.

Figure 7:
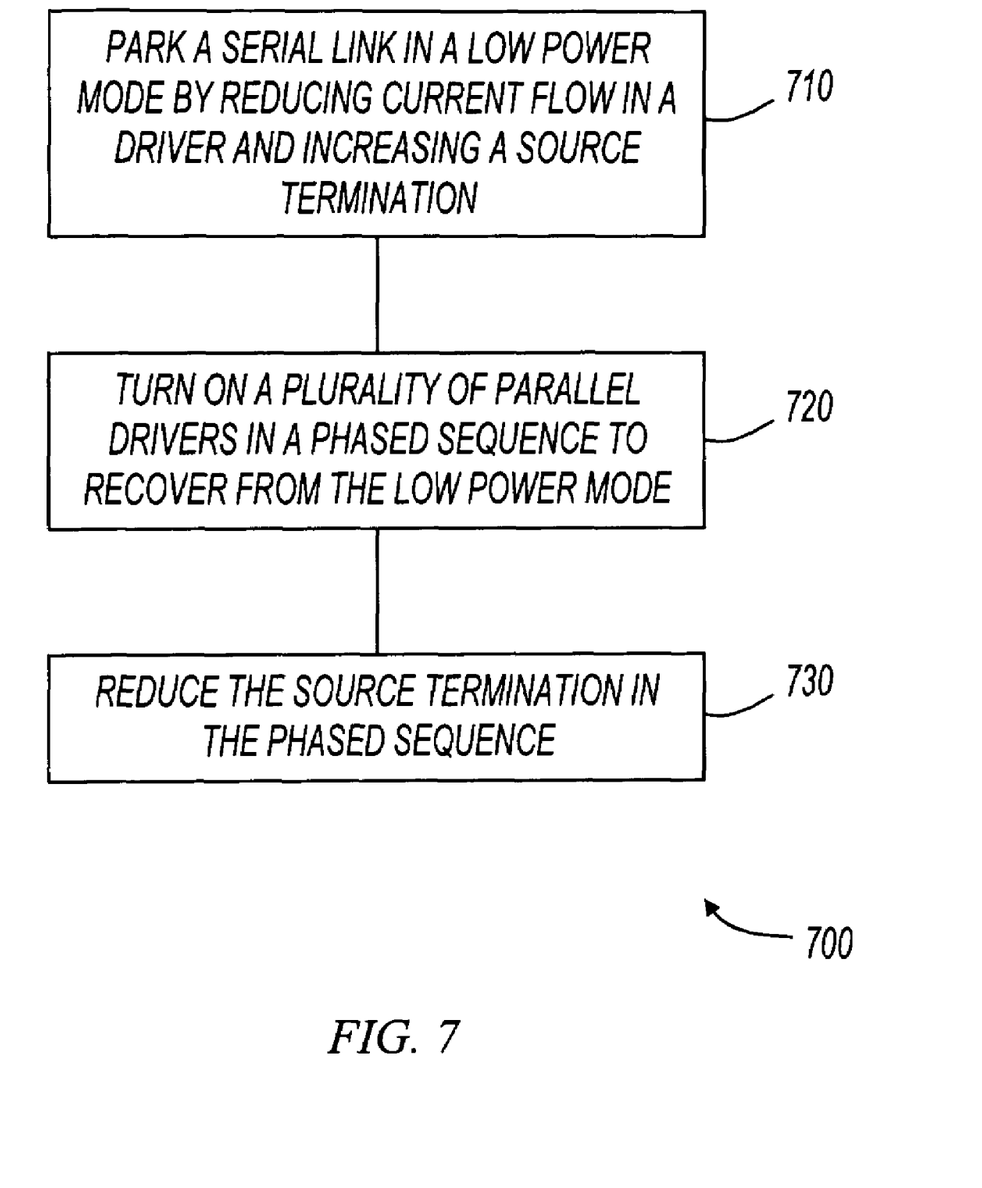
FIG. 7 shows a flowchart in accordance with various embodiments of the present invention.

FIG. 7 shows a flowchart in accordance with various embodiments of the present invention. In some embodiments, method 700 may be used to operate a serial link circuit with a low power mode. In some embodiments, method 700, or portions thereof, is performed by a serial link circuit, embodiments of which are shown in the various figures. In other embodiments, method 700 is performed by a memory controller or chipset. Method 700 is not limited by the particular type of apparatus performing the method. The various actions in method 700 may be performed in the order presented, or may be performed in a different order. Further, in some embodiments, some actions listed in FIG. 7 are omitted from method 700.

Method 700 begins at 710 in which a serial link is parked in a low power mode by reducing current flow in a driver and increasing a source termination. In some embodiments, current flow is reduced by turning off parallel current-mode drivers in a phased sequence. In some embodiments, source termination resistors are increased in value as the current flow is reduced. In the low power mode, the voltage on the serial link is preserved in a known state, so that the circuit can recover from the low power mode in a controlled fashion.

At 720, the plurality of parallel drivers is turned on in a phased sequence to recover from the low power mode. At 730, the source termination is reduced in the same phased sequence as that at 720. In some embodiments, the phased sequence is related to a resonant characteristic of a power supply net. By turning on the plurality of parallel drivers in a phased sequence, the transient on the power supply net may be reduced, allowing operation of circuits coupled to the power supply net sooner than otherwise.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A serial link circuit comprising:
   a plurality of parallel current-mode drivers, each of the plurality of parallel current-mode drivers including a current source to supply current to be switched between two output nodes; and
   a control circuit to turn on the current sources within the plurality of parallel current-mode drivers in a phased sequence to recover from a low power mode;
   wherein each of the plurality of current-mode drivers further comprises a source termination network coupled to the current source, and the source termination network is controllable to increase a termination resistance when entering the low power mode.

2. The serial link circuit of claim 1 wherein the control circuit is coupled to turn off the current sources within the plurality of parallel current-mode drivers in the phased sequence to enter the low power mode.

3. A serial link circuit comprising:
   a plurality of parallel current-mode drivers, each of the plurality of parallel current-mode drivers including a current source to supply current to be switched between two output nodes; and
   a control circuit to turn on the current sources within the plurality of parallel current-mode drivers in a phased sequence to recover from a low power mode;
   wherein timing of the phased sequence is related to a resonant characteristic of a power supply net providing power to the serial link circuit.

4. The serial link circuit of claim 3 wherein the phased sequence is timed to destructively combine transients on the power supply net.

5. An electronic system comprising:
   an antenna;
   a radio frequency circuit coupled to the antenna; and
   a chipset coupled to the radio frequency circuit, wherein the chipset includes a processor and a memory controller, the memory controller having a serial link circuit to communicate with a memory device, the serial link circuit including a plurality of parallel current-mode drivers that can be separately enabled and disabled, and a control circuit to enable the plurality of parallel current-mode drivers in a phased sequence to recover from a low power mode, wherein timing of the phased sequence is related to a resonance of a power supply net providing power to the serial link circuit.

6. The electronic system of claim 5 wherein the serial link circuit further comprises a source termination network coupled to the plurality of current-mode drivers.

7. The electronic system of claim 5 wherein the phased sequence is timed to destructively combine transients on the power supply net.

8. A method comprising:
   parking a serial link during a low power mode by reducing the current flow in a current driver and increasing a source termination; and
   increasing the current flow in the current driver and decreasing the source termination when recovering from the low power mode, wherein increasing the current flow comprises turning on a plurality of parallel current drivers in a phased sequence where the phased sequence is related to a resonant characteristic of a power supply net.

9. The method of claim 8 wherein turning on a plurality of parallel current drivers comprises turning on the plurality of parallel current drivers in a sequence to cause transients on the power supply net to destructively add.

* * * * *